3,321,295
METHOD OF CONTROLLING UNDESIRED PLANTS
Peter E. Newallis, Morris Plains, N.J., and John P. Chupp and Joseph W. Baker, Kirkwood, Mo., assignors to Monsanto Company, St. Louis, Mo., a corporation of Delaware
No Drawing. Filed Nov. 4, 1965, Ser. No. 506,411
12 Claims. (Cl. 71—2.5)

This application is a continuation-in-part of application Ser. No. 223,243, filed Sept. 12, 1962, which in turn is a continuation-in-part of application Ser. No. 834,424, filed Aug. 18, 1959, now abandoned.

The present invention relates to methods of controlling noxious vegetation employing polyhalobenzamides having heterocyclic amide groups. More particularly, this invention is concerned with methods of employing such compounds to retard or completely eliminate the growth of noxious vegetation, and especially to methods of achieving selective phytotoxic effects.

In accordance with this invention, it has been discovered that compounds of the following structure possess unusual and valuable herbicidal activity:

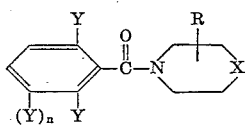

wherein $n$ is an integer of from 0 to 1; X is selected from the group consisting of —$CH_2$—, —NH—, —O— and —S—; Y is a halogen atom, such as chlorine, bromine, fluorine and iodine; and R is a radical selected from the group consisting of hydrogen, halogen, lower alkyl radicals, i.e., alkyl radicals having from one to four carbon atoms and hydroxy substituted lower alkyl radicals. A preferred group of these heterocyclic nitrogen analogs are those in which the Y radical in the above structure is a chlorine atom.

The amide portion of the compounds coming within the scope of the above formula is derived from cyclic, six-membered secondary amines, as for example 2-pipecoline, 3-pipecoline, 4-pipecoline, 2,6-dimethylpiperidine, 2,4-dimethylpiperidine, 2,3,6-trimethylpiperidine, 2-methyl-5-ethylpiperidine, piperazine, 2,6-dimethylpiperazine, 4-hydroxypropylpiperazine, 4,5-dimethylpiperazine, morpholine, 2-methylmorpholine, thiamorpholine, 2-ethylmorpholine, etc.

The term "polyhalobenzamide" as used herein throughout the specification shall be understood to refer to the polyhalobenzoyl heterocyclic amine compounds described herein.

These new chemical compounds may be prepared by the reaction of the appropriate halobenzoyl chloride with the appropriate heterocyclic secondary amine. This reaction can be carried out in an organic solvent in the presence of a hydrogen chloride acceptor, e.g., a tertiary amine or an excess of the amine reactant. Similarly the reaction can be carried out in an aqueous media, as for example in a dilute aqueous solution of sodium carbonate (HCl acceptor). Because of the exothermic nature of the reaction, it is preferred to slowly add the acid chloride to the solution of the amine and hydrogen chloride acceptor. After the addition of the acid chloride is complete, and the reaction mixture has been agitated at approximately 50° C. for a short period, e.g., 30 minutes to 1 hour, the polyhalobenzamide can be recovered from the reaction mixture by any means known to those skilled in the art. For example, the product can be extracted from an aqueous reaction mixture by the use of a suitable organic solvent, i.e., methylene chloride; the product is then recovered by stripping off the organic solvent at subatmospheric pressures.

The active compound is, of course, applied in an amount sufficient to exert the desired phytotoxic action. The amount of active compound present in the compositions as actually applied for retarding, destroying or preventing unwanted or undesired plants will vary with the manner of application, the particular plants for which the control is sought, the purpose for which the application is being made, and like variables. In general, the compositions as applied will contain from about 1% to about 90% by weight of the polyhalobenzamides.

Valuable phytotoxic effects will be observed by applications of small amounts, for example as low as one-half pound of active compound per acre, as well as high concentrations, for example 100 pounds per acre. As a general rule, the selective activity on grasses is exhibited at lower rates of application, for example 2 to 10 pounds per acre. For general application and phytotoxic effects on both grasses and dicotyledonous plants, it usually will be found necessary to use amounts in the range of 10 to 50 pounds per acre. The compositions of this invention are prepared by admixing one or more of the polyhalobenzamides defined heretofore in effective amounts, with a conditioning agent of the kind used and referred to in the art as a pest control adjuvant or modifier to provide formulations adapted for ready and efficient application to the area or locus to be protected using conventional applicator equipment.

The solid formulations, frequently referred to as "dusts" may contain in addition to the active ingredient, diluents or extenders, dispersing agents to prevent local high concentration and agents to facilitate distribution in soil or soil waters. Suitable solid diluents are those which render the compositions permanently dry and free-flowing. Thus hygroscopic materials are to be avoided unless the compositions also contain a separate substance to serve as an aid to flowability. Effective solid diluents preferably pulverulent or granular in form so as to be effective carriers for the active ingredient, are the natural clays such as china clays, the bentonites and the attapulgites; other minerals in a natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil. More concentrated formulations will require dilution by the user in order to properly condition the soil for the most effective usage. The concentrated solid formulations can be used with less danger if they are mixed with the surface soil by means of a disk plow or harrow at the time of application.

The liquid compositions may be solutions, or other liquid dispersions. The choice of a liquid medium will depend to some extent upon the physical properties of the active ingredient. The polyhalobenzamides are, for the most part, insoluble in water and therefore aqueous formulations will necessarily be dispersions of minute drops of particles of the water-insoluble substances in suspension in an aqueous medium. The known water-insoluble polyhalobenzamides of this invention may first be dissolved in a suitable organic solvent and the organic solution of the active ingredient then incorporated in water or in any aqueous medium to produce a heterogeneous dispersion of the active ingredient in water.

Many of the formulations are benefited by the incorporation of organic solvents for the active components, such as the organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 80 percent or more in order to provide a uniformly distributed formulation which is capable of maintaining its distributed state during storage, use and application to the soil.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acrylic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol monostearate, diglycol, oleate, polyethylene oxides, ethylene oxides condensation products with stearyl alcohol and octyl phenol, polyvinyl alcohols, salts, such as the acetate of polyamines from the reductive amination of ethylene/carbon monoxide polymers, laurylamine hydrochloride, laurylpyridinium bromine, stearyltrimethylammonium bromide, cetyldimethylbenzyl ammonium chloride, lauryl dimethylamine oxide and other simple and polymeric compositions having both hydrophillic and hydrophobic functions so as to enable the mixing of otherwise immiscible ingredients. Generally, the surface-active agents will represent only a minor portion of the formulation as used, for example, less than 15 percent and frequently as low as 0.05 percent by weight of the composition. Usually, concentrations of from 0.5 to 5 percent are found to be optimum.

A useful formulation may involves the solid or liquid concentrate of the active ingredient to which has been added formulation aids, one or more of the aforementioned herbicidal conditioning agents, so that the concentrates may be mixed with a suitable extender or diluent in the field at the time of use. Obviously for this purpose the dispersing or surface active agents will be present in larger concentrations so that upon dilution with water or a solid extended, compositions containing optimum proportions of dispersing agents and active ingredient will be prepared.

The polyhalobenzamides of this invention are effective when applied to plant parts and/or plant growing medium. Thus, the compositions are applied either as a spray or a dust to the locus or area to be protected from undesirable plant growth, and in the case of pre-emergence control, application can be made directly upon the plant growing medium in advance of as anticipated weed infestation, as for example, in the form of a spray applied directly to the surface of the plant growing medium, or in the form of a dry powdered composition which can be dispersed in the surface of the plant growing medium.

The term "plant parts," as employed in this application, is intended to be inclusive of stems, branches, foliage, roots and germinant seeds of plants. Further, the term "plant growing medium" is inclusive of any substance or media in which vegetation may take root and grow, and encompasses not only soil but compost, manure, mulch, humus and sand and the like, adapted to support plant growth.

Regardless of the method of application employed, a readily flowable composition is required. Both the solid and the liquid formulations above described are useful in the application of phytotoxic agents because they facilitate the uniform distribution and aid in the inhibition of undesirable plants by maintaining the active ingredient in a form which enables its prompt assimilation by the plant and the efficient utilization of its phytotoxic properties. The described conditioning agents enable the proper use to achieve the desired effects by an unskilled operator without elaborate equipment.

Fertilizer materials, other phytotoxic agents and other pest control agents, such as fungicides and insecticides, can be included in the compositions of the invention if desired.

The following examples are given to illustrate in detail the preparation and properties of some of the new compounds of this invention, but such are not to be considered a limitation thereof. Unless otherwise stated, parts given are parts by weight.

*Example 1*

To a suitable reaction vessel containing 7.6 grams of 2-methyl-5-ethylpiperidine and 4.3 grams of sodium carbonate in 100 cc. of water, there is added dropwise, with stirring, 14.6 grams of 2,3,6-trichlorobenzoyl chloride. During the addition care is taken so that the temperature does not exceed 60° C. After the acid chloride addition is complete, the reaction mixture is stirred for about 1½ hours. The mixture is then cooled and allowed to separate into a lower oil layer and an upper water layer. The oil is extracted with methylene chloride and stripped at 60° C. (8 mm. Hg abs. pressure) to give 20 grams of N-(2,3,6-trichlorobenzoyl)-5-ethyl-2-methylpiperidine. This compound is a red-amber liquid which is insoluble in water; slightly soluble in ether, heptane and ethanol; and soluble in acetone and benzene.

*Analysis.*—Calculated: Cl, 31.8%; N, 4.18%. Found: Cl, 35.5%; N, 3.6%.

Utilizing the procedure of Example 1 except by substituting an equivalent amount of the following heterocyclic secondary amines for the 2-methyl-5-ethylpiperidine of said example, a good yield of the corresponding 2,3,6-trichlorobenzoyl heterocyclic amines are obtained. The amine reactants and the analytical data on the products obtained are summarized below:

| Example No. | Amine Reactant | Product Analysis | | Physical Properties |
|---|---|---|---|---|
| | | Calc. | Found | |
| 2 | N-methylpiperazine | Cl 34.9 <br> N 9.22 | 35.1 <br> 9.4 | White solid, M.P. 129.5° C. |
| 3 | Morpholine | Cl 35.8 <br> N 4.7 | 37.1 <br> 4.3 | White solid, M.P. 137.2. |
| 4 | 2-pipecoline | Cl 34.6 <br> N 4.5 | 35.5 <br> 4.3 | Dark amber glassy solid. |
| 5 | 4-pipecoline | Cl 34.6 <br> N 4.5 | 33.4 <br> 4.5 | Tan solid, M.P. 95.5. |
| 6 | Piperidine | Cl 36.2 | 33.6 | Yellow solid, M.P. 87.2. |
| 7 | 3,5-dimethylmorpholine | Cl 32.9 <br> N 4.3 | 33.2 <br> 4.3 | Viscous red oil. |
| 8 | 2,6-dimethylpiperidine | Cl 33.2 <br> N 4.4 | 39.6 <br> 3.5 | White solid. |
| 9 | N'-hydroxyethylpiperazine | Cl 31.5 <br> N 8.3 | 32.6 <br> 8.3 | Amber liquid. |
| 10 | 2,6-dimethylmorpholine | Cl 32.9 <br> N 4.4 | 36.4 <br> 3.7 | Tan solid. |

The efficiency of the above compounds is surprising, for related compounds possess little or no phytotoxic activity. When tested as described above, at 25 lbs. per acre, a random group of such related compounds are found to possess little or no phytotoxic activity.

TABLE C

| | A | B | C | D | E | F | G | H | I | J | K | L | M |
|---|---|---|---|---|---|---|---|---|---|---|---|---|---|
| 1(3,4-dichlorobenzoyl)2-pipecoline | 0 | | 0 | | 0 | 0 | | | | 0 | 0 | | 0 |
| 1(3-bromobenzoyl)2,6-dimethylpiperidine | 0 | | 0 | | 0 | 0 | | | | 0 | 0 | | 0 |
| 2(3,4-dichlorobenzamide)4-methylpyridine | 0 | | 0 | | 0 | 0 | | | | 0 | 0 | | 3 |
| 1(2,4-dichlorobenzoyl)2,6-dimethylpiperidine | 0 | | 0 | | 0 | 0 | | | | 0 | 0 | | 0 |
| 1(4-chlorobenzoyl)2-pipecoline | 0 | | 0 | | 0 | 0 | | | | 0 | 0 | | 2 |

Whereas, results similar to those obtained in Tables A and B above are obtained when the following polyhalobenzamides are tested as above:

1(2,6-dichlorobenzoyl)2-pipecoline
1(2,6-dichlorobenzoyl)2,6-dimethylpiperidine
1(2,6-dichlorobenzoyl)2,6-dimethylmorpholine
1(2,6-dichlorobenzoyl)3-chloro-2-pipecoline
4(2,6-dichlorobenzoyl)thiamorpholine
1(2,6-dichlorobenzoyl)5-ethyl-2-methylpiperidine
1(2,6-dichlorobenzoyl)4-methylpiperazine
1(2,6-dichlorobenzoyl)piperidine
1(2,6-dichlorobenzoyl)4-hydroxyethylpiperazine
1(2,6-dibromobenzoyl)2-pipecoline
4(2,6-dibromobenzoyl)morpholine
1(2,6-dibromobenzoyl)piperidine
1(2,6-diiodobenzoyl)2-pipecoline
1(2,6-difluorobenzoyl)2-pipecoline
1(2,6-dichlorobenzoyl)2,6-dimethylpiperazine
1(2,6-dichlorobenzoyl)2,5-diethylpiperazine
1(2,6-dibromobenzoyl)2,5-dibutylpiperazine
1(2,6-dichlorobenzoyl)methylpyridine
4(2,6-dichlorobenzoyl)morpholine
4(2,6-dichlorobenzoyl)3,5-dimethylmorpholine
1(2,3,6-trichlorobenzoyl)2,3-dimethylpiperazine
1(2,3,6-trichlorobenzoyl)2,3-dimethylpiperazine
1(2,3,6-trichlorobenzoyl)2,3,5,6-tetrachloropiperazine
1(2,3,6-trichlorobenzoyl)3-hydroxyethylpiperazine
1(2,3,6-trichlorobenzoyl)2,5-diethylpiperazine
1(2,3,6-trichlorobenzoyl)2,5-dibutylpiperazine
1(2,3,6-trichlorobenzoyl)1,2,6-trimethylpiperazine
4(2,3,6-trichlorobenzoyl)thiamorpholine
4(2,3,6-trichlorobenzoyl)2-ethylmorpholine
4(2-bromo-3,6-dichlorobenzoyl)thiamorpholine
1(2-bromo-3,6-dichlorobenzoyl)4-pipecoline
1(2,3,6-triiodobenzoyl)3-chloro-2-pipecoline
1(2-fluoro-3,6-dichlorobenzoyl)4-pipecoline
1(2,3,6-tribromobenzoyl)2,6-dimethylpiperidine Selective activity with respect to several genera of grasses is illustrated by the data in the above tables. The botanical types of grasses which are effectively controlled by means of the polyhalobenzamides of this invention embrace a large number of undesirable plants or weeds, frequently found in vegetable crops. This invention is not limited to the elimination of undesirable grasses in the presence of broadleaf plants and also extends to the elimination of undesirable grasses in the presence of other narrowleaf plants. In addition, certain undesirable broadleaf plants in the same respective plant families as morning glory, sugar beet and pigweed for example, can be effectively controlled while valuable broadleaf plants in the same plant family as cotton, for example, are completely unaffected.

*Example 12.—Dust formulations*

The following compositions are adapted for direct application as dusts for the destruction or prevention of weeds using conventional applicator equipment. The dusts are mixed by blending or mixing the ingredients and grading the mix to give compositions having an average particle size less than about 50 microns.

(I)

| | Parts |
|---|---|
| 4(2,3,6-trichlorobenzoyl)2,6-dimethylmorpholine | 25 |
| Bentonite | 75 |
| | 100 |

(II)

| | |
|---|---|
| 1(2,3,6-trichlorobenzoyl)2-pipecoline | 8 |
| Talc | 92 |
| | 100 |

*Example 13.—Water-dispersible powders*

The following powdered compositions are adapted for dispersing in water for application as a spray for the destruction and prevention of weeds. The powdered compositions are made by intimately mixing the listed ingredients, using conventional mixing or blending equipment, and then grinding the mixture to give a powder having an average particle size less than about 50 microns.

(I)

| | Parts |
|---|---|
| 4(2,3,6-trichlorobenzoyl)2,6-dimethylmorpholine | 55 |
| Potassium disulfonate of dibutylphenol (wetting and dispersing agent) | 4 |
| Bentonite | 41 |
| | 100 |

(II)

| | |
|---|---|
| 1(2,3,6-trichlorobenzoyl)2-pipecoline | 40 |
| Sodium citrate dehydrate | 5 |
| Disodium phosphate | 3 |
| Sodium dodecyl benzene sulfonate | 7 |
| Attapulgite | 45 |
| | 100 |

*Example 14.—Water-dispersible liquid compositions*

The following compositions are in liquid form and are adapted to give aqueous dispersions for application as sprays. In the case of some of the benzamines, the compositions will not be complete solutions, but rather will be dispersions of solid in the solvent used. The liquid or fluid compositions shown are prepared by thoroughly mixing or dispersing the active compounds and one or more conditioning agents such as dispersing or emulsifying agents, in an organic liquid diluent.

(I)

| | Parts |
|---|---|
| 4(2,3,6-trichlorobenzoyl)2,6-dimethylmorpholine | 25 |
| Long chain fatty alcohol sulfate (emulsifying agent) | 3 |
| Methyl cellulose (dispersing agent) | 2 |
| Methylethyl ketone | 70 |
| | 100 |

The compounds of Examples 2 through 10 are insoluble in water and soluble in varying degrees in ether, acetone, benzene, heptane, chloroform, ethanol and ethyl acetate.

Example 11.—Pre-emergence tests

The relative value of several polybenzamides in the pre-emergent control of undesired plants is determined by planting in greenhouse flats, seeds of thirteen different plants, each representing a principal botanical type. A solution or suspension of the test compound is prepared by first mixing 0.5 gm. with 25 cc. of acetone or some other suitable solvent. 4.1 cc. of the stock solution is diluted to a volume of 15 cc with the solvent used and fifteen cc. of this solution is then sprayed over the entire area of a pre-planted pan (aluminum 9½″ x 5¼″, soil ⅝″ deep, seeds ⅜″ from top). This amount of chemical for the test area corresponds to a rate of approximately 25 lbs. per acre.

After spraying, the pans are placed in ½″ of water and allowed to absorb moisture through the perforated bottom until the soil surface is about one-half moist. The pans are then transferred to a wet sand bench in a greenhouse.

Fourteen days after application of the test chemical the results are observed and recorded. The number of plants of each species which germinated and grew are counted and such data are converted into phytotoxic ratings, taking into account the germination and growth in untreated plants. In the following tables of evaluation data, these plants are presented by letters as follows:

A—Morning glory
B—Brome-cheat grass
C—Rye grass
D—Buckwheat
E—Radish-mustard
F—Sugar beet
G—Cotton
H—Corn
I—Foxtail grass
J—Barnyard grass
K—Crab grass
L—Field bindweed
M—Pigweed The relative value of each compound with respect to its effect on the various plants is indicated by a number as follows:

0—No phytotoxicity
1—Slight phytotoxicity
2—Moderate phytotoxicity
3—Severe phytotoxicity

TABLE A

| | A | B | C | D | E | F | G | H | I | J | K | L | M |
|---|---|---|---|---|---|---|---|---|---|---|---|---|---|
| N-(2,3,6-trichlorobenzoyl)5-ethyl-2-methyl piperidine | 3 | | 2 | | 3 | 2 | | | | 2 | 2 | | 3 |
| 2(2,3,6-trichlorobenzoyl)4-pipecoline | 2 | | 0 | | 1 | 2 | | | | 2 | 2 | | 3 |
| 1(2,3,6-trichlorobenzoyl)4-pipecoline | 3 | 2 | 1 | 2 | 1 | 2 | 2 | 0 | 2 | 0 | 0 | 3 | 2 |
| 1(2,3,6-trichlorobenzoyl)2-pipecoline | 3 | 2 | 3 | 3 | 3 | 3 | 3 | 1 | 3 | 2 | 3 | 3 | 3 |
| 1(2,3,6-trichlorobenzoyl)2,6-dimethylpiperidine | 3 | | 2 | | 3 | 3 | | | | 2 | 3 | | 3 |
| 1(2,3,6-trichlorobenzoyl)4-hydroxyethylpiperazine | 3 | | 0 | | 2 | 2 | | | | 1 | 1 | | 3 |
| 1(2,3,6-trichlorobenzoyl)4-methylpiperazine | 2 | 2 | 0 | 2 | 0 | 2 | 2 | 0 | 0 | 0 | 0 | 1 | 2 |
| 4(2,3,6-trichlorobenzoyl)morpholine | 3 | | 2 | 1 | 1 | 2 | 3 | 3 | 0 | 1 | 1 | 3 | 3 |
| 1(2,3,6-trichlorobenzoyl)piperidine | 2 | 2 | 1 | 2 | 1 | 1 | 2 | 0 | 0 | 0 | 2 | 2 | 3 |
| 1(2,3,6-trichlorobenzoyl)2,4,6-trimethyl piperidine | 3 | | 3 | | 3 | 3 | | | | 3 | 3 | | 3 |
| 4(2,3,6-trichlorobenzoyl)2,6-dimethylmorpholine | 3 | | 2 | | 3 | 3 | | | | 3 | 2 | | 3 |
| 4(2,3,6-trichlorobenzoyl)3,5-dimethylmorpholine | 3 | | 2 | | 3 | 3 | | | | 3 | 3 | | 3 |

When the polyhalobenzamides of this invention are used at lower rates of application, their specificity with respect to grasses and certain broadleaf plants is more evident. The following data demonstrate their utility:

TABLE B

| | Rate | A | B | C | D | E | F | G | H | I | J | K | L | M |
|---|---|---|---|---|---|---|---|---|---|---|---|---|---|---|
| N(2,3,6-trichlorobenzoyl)5-ethyl-2-methylpiperidine | 5 | 3 | 2 | 1 | | 2 | 3 | | 0 | | 2 | 2 | | 3 |
|  | 1 | 3 | 1 | 0 | | 1 | 1 | | 0 | | 0 | 0 | | 2 |
| 1(2,3,6-trichlorobenzoyl)2,6-dimethylpiperidine | 5 | 3 | 0 | 0 | 3 | 2 | 3 | | | | 0 | 0 | | 3 |
|  | 1 | 2 | 0 | 0 | 1 | 1 | 2 | | | | 0 | 0 | | 2 |
| 1(2,3,6-trichlorobenzoyl)2-pipecoline | 5 | 3 | 3 | 2 | 2 | 2 | 1 | 2 | 0 | 3 | 2 | 3 | 3 | 3 |
|  | 1 | 3 | 0 | 0 | 2 | 2 | 2 | 3 | 0 | 1 | 2 | 1 | 2 | 3 |
|  | ½ | 3 | 0 | 0 | 2 | 0 | 3 | 2 | 0 | 0 | 0 | 1 | 2 | 3 |
|  | ¼ | 3 | 0 | 0 | 0 | 0 | 2 | 1 | 0 | 0 | 0 | 1 | 2 | 2 |
|  | ⅛ | 2 | 0 | 0 | 0 | 0 | 1 | 0 | 0 | 0 | 0 | 1 | 2 | 1 |
| 4(2,3,6-trichlorobenzoyl)2,6-dimethylmorpholine | 5 | 3 | 2 | 0 | | 2 | 3 | | 1 | | 2 | 3 | | 3 |
|  | 1 | 2 | 0 | 0 | | 2 | 2 | | | | 0 | 0 | | 3 |
|  | ½ | 3 | 0 | 0 | | 2 | 2 | | | | 0 | 0 | | 3 |
| 1(2,3,6-trichlorobenzoyl)2,4,6-trimethylpiperidine | 5 | 3 | 1 | 0 | | 3 | 3 | | | | 1 | 0 | | 3 |
|  | 1 | 3 | 0 | 0 | | 1 | 3 | | | | 0 | 0 | | 3 |
| 4(2,3,6-trichlorobenzoyl)3,5-dimethyl 3,5-dimethylmorpholine | 5 | 3 | 1 | 0 | | 2 | 3 | | | | 0 | 0 | | 3 |
|  | 1 | 3 | 0 | 0 | | 1 | 2 | | | | 0 | 0 | | 2 |
| 4(2,3,6-trichlorobenzoyl)morpholine | 5 | 0 | 3 | 0 | 0 | 0 | 0 | 0 | 0 | 3 | 0 | 0 | 0 | 3 |
| 1(2,3,6-trichlorobenzoyl)piperazine | 5 | 3 | 0 | 0 | 0 | 2 | 3 | | | | 0 | 1 | | 3 |
|  | 1 | 2 | 0 | 0 | 0 | 0 | 1 | | | | 0 | 0 | | 2 |

(II)

| | Parts |
|---|---|
| 1(2,3,6-trichlorobenzoyl)2-pipecoline | 30 |
| Alkylated aryl polyether alcohol (wetting and dispersing agent) | 5 |
| Methyl isobutyl ketone | 65 |
| | 100 |

*Example 15.—Granular compositions*

The following compositions are adapted for application by means of a fertilizer spreader apparatus or similar equipment. The compositions are readily prepared by mixing the ingredients with water to form a paste. The paste is then extruded, dried and ground to give the desired granular size. Preferably, the granules will be in the order of one thirty-second to one quarter inch in diameter.

(I)

| | Parts |
|---|---|
| 4(2,3,6-trichlorobenzoyl)2,6-dimethylmorpholine | 10 |
| Goulac (dispersing agent) | 5 |
| Kerosene | 3 |
| Gelatin (binding agent) | 22 |
| Talc | 60 |
| | 100 |

(II)

| | Parts |
|---|---|
| 1(2,3,6-trichlorobenzoyl)2-pipecoline | 10 |
| Goulac | 5 |
| Dextrin | 20 |
| Fuller's earth | 63 |
| Hydrocarbon oil | 2 |
| | 100 |

*Example 16.—Oil-water dispersible powders*

The following powdered compositions are adapted for use in the preparation of spray compositions using either oil, water or a combination of oil and water as the liquid diluent. The powders are made by mixing and grinding as in the case of the powders of Example 12.

(I)

| | Parts |
|---|---|
| 4(2,3,6-trichlorobenzoyl)2,6-dimethylmorpholine | 60 |
| Alkylated aryl polyether alcohol (wetting and dispersing agent) | 10 |
| Fuller's earth | 30 |
| | 100 |

(II)

| | Parts |
|---|---|
| 1(2,3,6-trichlorobenzoyl)2-pipecoline | 70 |
| Ethylene oxide - stearate - laurate (emulsifying agent) | 7 |
| Pyrophyllite | 23 |
| | 100 |

While this invention has been described with respect to certain embodiments, it is not so limited, and it is to be understood that variations and modifications thereof obvious to those skilled in the art may be made without departing from the spirit or scope of the invention.

What is claimed is:

1. A method of controlling undesired plants which comprises applying to the locus to be protected a growth altering amount of a compound of the structure

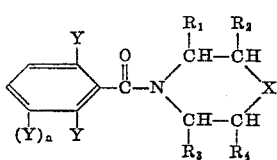

wherein $n$ is an integer of from 0 to 1; X is a radical selected from the group consisting of —$CH_2$—, —NH—, —O— and —S—; Y is a halogen atom and $R_1$, $R_2$, $R_3$ and $R_4$ are each selected from the group consisting of hydrogen, halogen, lower alkyl radicals and hydroxy subsituted lower alkyl radicals.

2. A method of selectively inhibiting growth of undesired plants which comprises applying to an area having both desired and undesired plant species a compound of the structure

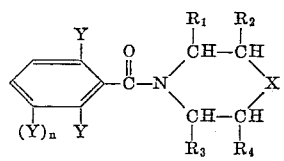

wherein $n$ is an integer of from 0 to 1; X is a radical selected from the group consisting of —$CH_2$—, —NH—, —O— and —S—; Y is a halogen atom and $R_1$, $R_2$, $R_3$ and $R_4$ are each selected from the group consisting of hydrogen, halogen, lower alkyl radicals and hydroxy substituted lower alkyl radicals, at a rate of application which inhibits the growth of at least one of the undesired plant species.

3. A method of selectively inhibiting the germination and growth of plants comprising desired and undesired species in the same plant growing medium which comprises applying to the plant growing medium a compound of the structure

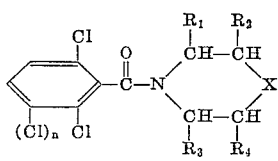

wherein $n$ is an integer of from 0 to 1; X is a radical selected from the group consisting of —$CH_2$—, —O—, —NH—, and —S—; and $R_1$, $R_2$, $R_3$ and $R_4$ are each selected from the group consisting of hydrogen, halogen and lower alkyl radicals, in an amount which inhibits the growth of at least one of the undesired plant species.

4. A method of selectively inhibiting the germination and growth of plants comprising desired and undesired species in the same plant growing medium which compries applying to the plant growing medium a compound of the structure

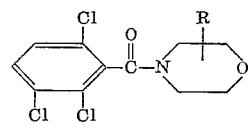

wherein R is a lower alkyl radical, in an amount which inhibits the growth of at least one of the undesired plant species.

5. A method of claim 4 wherein the compound is 4(2,3,6-trichlorobenzoyl)2,6-dimethylmorpholine.

6. A method of selectively inhibiting the germination and growth of plants comprising desired and undesired species in the same plant growing medium which comprises applying to the plant growing medium a compound of the structure

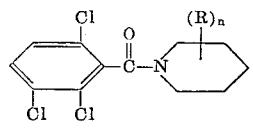

wherein R is a lower alkyl radical, in an amount which inhibits the growth of at least one of the undesired plant species.

7. A method of claim 6 wherein the compound is 1(2,3,6-trichlorobenzoyl)2-pipecoline.

8. A method of claim 6 wherein the compound is 1(2,3,6-trichlorobenzoyl)5-ethyl-2-methylpiperidine.

9. A method of claim 6 wherein the compound is 1(2,3,6-trichlorobenzoyl)2,6-dimethylpiperidine.

10. A method of claim 6 wherein the compound is 1(2,3,6-trichlorobenzoyl)2,4,6-trimethylpiperidine.

11. A method of selectively inhibiting the germination and growth of plants comprising desired and undesired species in the same plant growing medium which comprises applying to the plant growing medium a compound of the structure

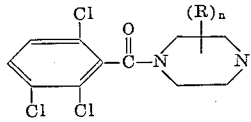

wherein $n$ is an integer of from 0 to 1 and R is a lower alkyl radical, in an amount which inhibits the growth of at least one undesired plant species.

12. A method of claim 11 wherein the compound is 1(2,3,6-trichlorobenzoyl)piperazine.

References Cited by the Examiner
UNITED STATES PATENTS

| | | | |
|---|---|---|---|
| 2,703,802 | 3/1955 | Norton | 71—2.5 |
| 2,864,682 | 12/1958 | Speziale | 71—2.5 |
| 2,937,204 | 5/1960 | Harris et al. | 71—2.6 X |
| 3,014,965 | 12/1961 | Newcomer et al. | 71—2.6 X |
| 3,156,553 | 11/1964 | Searle | 71—2.6 |

OTHER REFERENCES

Pizey et al.: J. Sci. Food Agric., Nov. 10, 1959, pp. 566 to 584.

Plant Regulators, National Academy of Sciences, CBCC positive Data Series No. 2, June 1955, pp. b, c, 1 and 39 relied on.

LEWIS GOTTS, *Primary Examiner.*

JAMES O. THOMAS, *Examiner.*